United States Patent [19]

Karabed et al.

[11] Patent Number: 4,888,775
[45] Date of Patent: Dec. 19, 1989

[54] TRELLIS CODES FOR PARTIAL RESPONSE CHANNELS

[75] Inventors: Razmik Karabed; Paul H. Siegel, both of San Jose, Calif.

[73] Assignee: International Business Machines Corporation, Armonk, N.Y.

[21] Appl. No.: 169,919

[22] Filed: Mar. 18, 1988

[51] Int. Cl.$^4$ .............................. G06F 11/10
[52] U.S. Cl. .................... 371/43; 371/37.4
[58] Field of Search ............ 371/43, 44, 45, 37, 371/37.4; 341/59, 81, 95; 375/18, 39

[56] References Cited

U.S. PATENT DOCUMENTS 4,707,681 11/1987 Eggenberger ................. 341/59
4,786,890 11/1988 Marcus ......................... 341/95 X

OTHER PUBLICATIONS

J. K. Wolf and G. Ungerboeck, "Trellis Coding for Partial-Response Channels", IEEE Trans. Comm., vol. COM-34, No. 8, Aug. 1986, pp. 765-773.

T. A. Lee and C. Heegard, "An Inversion Technique for the Design of Binary Convolutional Codes for the 1-$D^N$ Channel", Proc. IEEE Regional Meeting, John Hopkins, Feb. 1985.

A. R. Calderbank, C. Heegard and T. A. Lee, "Binary Convolutional Codes with Application to Magnetic Recording", IEEE Trans. Info. Th., vol. IT-32, No. 6, Nov. 1986, pp. 797-815.

H. Thapare and A. Patel, "A Class of Partial Response Systems for Increasing Storage Density in Magnetic Recording", presented at Intermag 1987, Tokyo, Japan.

*Primary Examiner*—Jerry Smith
*Assistant Examiner*—Robert W. Beausoliel
*Attorney, Agent, or Firm*—Henry E. Otto, Jr.

[57] ABSTRACT

An improved method is described for coding input strings to improve reliability of partial response channels. This method comprises encoding an input string into an intermediate string using a binary convolutional code, and encoding the intermediate string using a nonlinear inner code that repeats and inverts selected bits of the intermediate string. The inner code has a coding rate of less than one. As specifically illustrated, this method provides coding gains for partial response channels of at least 4.8 dB.

15 Claims, 1 Drawing Sheet

```
INPUT      OUTPUT
1 0 0 1 /  2  0 -2  0
0 0 1 1 /  1 -1  0  2
1 1 0 0 /  2  1 -1 -2
0 1 1 0 /  1  0  1  0

1 0 0 1 /  1 -1 -2  0
0 0 1 1 /  0 -2  0  2
1 1 0 0 /  1  0 -1 -2
0 1 1 0 /  0 -1  1  0

1 0 0 1 /  0  1 -1  0
0 0 1 1 / -1  0  1  2
1 1 0 0 /  0  2  0 -2
0 1 1 0 / -1  1  2  0

1 0 0 1 / -1  0 -1  0
0 0 1 1 / -2 -1  1  2
1 1 0 0 / -1  1  0 -2
0 1 1 0 / -2  0  2  0
```

TRELLIS CODES FOR PARTIAL RESPONSE CHANNELS

CROSS REFERENCE TO RELATED APPLICATIONS

U.S. applications Ser. Nos. 07/169,918 and 07/169,919, filed concurrently with this application, disclose other techniques for improving coding gain on partial response channels and different most probable sequence calculations for the outputs.

TECHNICAL FIELD

This invention relates to techniques for transmission of binary digital data over partial response channels using maximum likelihood (PRML) sequence detection. More particularly, it relates to trellis codes for PRML channels which provide significantly improved coding gains.

BACKGROUND OF THE INVENTION

The following prior art references are considered by applicants to be the most pertinent to the present invention:

[A] J. K. Wolf and G. Ungerboeck, "Trellis Coding for Partial-Response Channels," IEEE Trans. Comm., Vol. COM34, No. 8, August 1986, pp. 765-773.

[B] T. A. Lee and C. Heegard, "An Inversion Technique for the Design of Binary Convolutional Codes for the $1-D^N$ Channel," Proc. IEEE Regional Meeting, Johns Hopkins, February 1985.

[C] A. R. Calderbank, C. Heegard and T. A. Lee, "Binary Convolutional Codes with Application to Magnetic Recording," IEEE Trans. Info. Th., Vol. IT32, No. 6, November 1986, pp. 797-815.

[D] H. Thapar and A. Patel, "A Class of Partial Response Systems for Increasing Storage Density in Magnetic Recording," presented at Intermag 1987, Tokyo, Japan.

Partial response signalling with maximum likelihood sequence detection in digital data communication and recording applications is a known technique. References [A], [B], [C] Supra, described trellis coding techniques to provide coding gain required in noisy or otherwise degraded channels. These techniques apply to channels described by channel transfer polynomials of the form $(1 \pm D^N)$, for $N \geq 1$, and which are precisely those obtained by interleaving N times a channel with transfer polynomial $(1 \pm D)$.

References [A], [B] and [C] utilize a binary convolutional code with specified rate and Hamming distance properties as the trellis code. The coding gain of these trellis codes is determined by the free Euclidean distance of the channel outputs which is lower bounded by (the lowest even number greater than or equal to) the free Hamming distance of the convolutional code. The number of consecutive zeros in the output signal must be limited for purposes of timing and gain control. In order to control the maximum run of zero samples in the channel output signal, or "zero run-length" (ZRL), the encoded data is modified by adding (modulo 2) a fixed binary sequence, called a "coset vector", to the encoder output.

In addition, Reference [A]'s approach requires an inverse channel precoder to make nonzero output samples correspond to ones in the channel input, and conversely. However, the approaches in References [B] and [C] do not require a precoder; instead they invert the original code (termed the "magnitude code") and convert it into convolutional code (termed the "sign code"), which is then used as the actual trellis code. References [A], [B] and [C] each specify the underlying convolutional code to be one with maximum Hamming distance $d^H$.

The conventional biphase code described in Reference [C] shows that the approaches of References [A], [B] and [C] do not always produce, for a given code rate and coding gain, the code with minimum detector complexity and/or minimum zero sample run-length constraint.

The techniques heretofore disclosed (e.g., in References [A], [B] and [C]) do not produce any codes for the extended class of suitable partial response channels described in Reference [D], which describes a class of channels with transfer polynomials of the form $(1-D)(1+D)^N$, where $N \geq 2$.

There is a need for techniques which can provide codes which improve upon those found in the prior art by enabling significantly enhanced coding gains.

SUMMARY OF THE INVENTION

Toward this end and according to the invention, an improved method is described for coding input strings to improve reliability of partial response channels. This method comprises encoding an input string into an intermediate string using a binary convolutional code, and encoding the intermediate string using a nonlinear inner code that repeats and inverts selected bits of the intermediate string. The inner code has a coding rate of less than one.

According to one embodiment, the inner code and the channels are interleaved and the channel transfer polynomial is $(1-D^N)$, with N preferably 2, and an inner code rate of at least one-half and less than one.

According to another embodiment, involving so-called "extended" class 4 partial response channels, the inner code is interleaved, the channel transfer polynomial is $(1+D-D^2-D^3)$, and the inner code rate is preferably one-half.

DESCRIPTION OF PREFERRED EMBODIMENTS GENERAL

According to the invention, improved trellis coding techniques are described for reliable data transmission over noisy partial response channels with:

(a) Transfer polynomials $(1 \pm D^N)$, which are interleaved dicode and interleaved class 1 channels, and also (b) Transfer polynomial $(1-D)(1+D)^2$, called "extended" class 4 partial response (EPR4).

Figure 1:
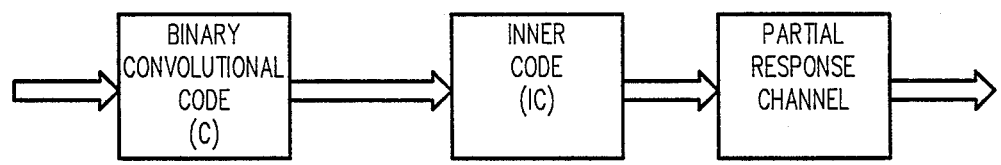
FIG. 1 is a block diagram depicting a trellis coding technique according to the invention.

These novel techniques are depicted in FIG. 1, wherein a binary convolutional code C is used in conjunction with an inner code, IC.

In the Appendix hereto, applicants show how they derived Equations (A2) and (A13) which specify the novel precise relationship between the Euclidean distance of two channel output sequences and the Hamming distance of their corresponding binary channel inputs, with specific attention to the interleaved $(1-D)$ channels and the $(1-D)(1+D)^2$ channel. These Equations (A2) and (A13) validate applicants' concatenated coding technique described by FIG. 1. This technique can make use of inner codes of any rate; however, the trellis codes which provide rates and coding gains of present interest are achieved with inner codes with rates greater than or equal to $\frac{1}{2}$. Specifically, four inner codes, denoted IC1, IC2, IC3 and IC4 are described with rates $\frac{1}{2}$, $\frac{2}{3}$, $\frac{3}{4}$ and $\frac{4}{5}$, respectively. The codes for use with $(1-D)$ are systematic block codes:

IC1: $x_1 \rightarrow x_1\bar{x}_1$
IC2: $x_1x_2 \rightarrow x_1x_2\bar{x}_2$
IC3: $x_1x_2x_3 \rightarrow x_1x_2\bar{x}_2x_3$
IC4: $x_1x_2x_3x_4x_5 \rightarrow x_1x_2\bar{x}_2x_3x_4\bar{x}_4x_5\bar{x}_5$ These codes can be interleaved N times for use on the interleaved dicode channel with transfer polynomial $(1-D^N)$. Alternatively, they may be interleaved twice for use on channels with polynomial $(1-D)(1+D)^N$.

The bounds on the free Euclidean distance, $d_{free}^2$, as a function of the free Hamming distance, $d_{free}^H$, of the code C for IC1 and IC2 are as follows, proofs being given in the Appendix:

IC1: $d_{free}^2 \geq 4d_{free}^H + 2$ (1)

IC2: $d_{free}^2 \geq 2d_{free}^H$ (2)

The bounds in Equations (1) and (2) apply to the interleaved trellis codes as used on the interleaved channel.

For a convolutional code C with free Hamming distance, $d_{free}^H$, the free Euclidean distance of the interleaved IC1 concatenated scheme, $d_{free}^2$, when applied to the $(1-D)(1+D)^2$ channel, satisfies $$d_{free}^2 \geq \min\{8d_{free}^H + 4, 4d_{free}^H + 8\}$$ (3)

While it is not possible to formulate useful bounds for IC3 and IC4, these inner codes are included because they also produced concatenated codes of potential interest.

APPLICATIONS OF IC1, IC2, IC3 AND IC4

For each of these inner codes, the technique for obtaining concatenated code rates equal to one-half will now be explained.

By concatenating an IC1 on a $(1-D)$ channel with the optimal rate 1 code, a combined code rate of $\frac{1}{2}$ is achieved. This is a block code with a large free Euclidean distance $d_{free}^2 = 6$ and maximum zero run length (ZRL) of 1, as noted in Reference [C].

By concatenating an IC2 of rate $\frac{2}{3}$ on a $(1-D)$ channel with rate $\frac{3}{4}$ binary convolutional codes, a family of combined codes is obtained with rate 3/6 and maximum ZRL of 2.

By concatenating an IC3 of rate $\frac{3}{4}$ on a $(1-D)$ channel with rate $\frac{2}{3}$ binary convolutional codes, a family of combined codes with rate 2/4 and maximum ZRL of 3 is obtained.

By concatenating an IC4 of rate $\frac{4}{5}$ on a $(1-D)$ channel with rate 4/5 binary convolutional codes, a family of combined codes with rate 4/8 and maximum ZRL of 3 is obtained.

By concatenating an interleaved IC1 code of rate $\frac{1}{2}$ used on a $(1-D)(1+D)^2$ channel with the optimal rate 1 code, a rate 2/4 code is obtained, which is an "interleaved biphase" code that provides large free Euclidean distance $d_{free}^2 = 12$, corresponding to a coding gain of 4.8 dB. The maximum zero sample run length in the output is 1.

Table 1 specifies codes derived for inner codes IC1 and IC2 using the techniques just described. The 2-state code is the only rate $\frac{1}{2}$ code; it is the "biphase code" obtained from IC1. All the others are rate 3/6 codes obtained using IC2. The underlying rate $\frac{2}{3}$ binary convolutional codes for the IC2 codes are defined by means of a generator matrix G(D). The polynomial entries in the matrix are presented in octal notation with low degree terms at the left, e.g. $62 = 110\ 010$ represents $1+D+D^4$. These convolutional codes per se are optimal with respect to Hamming distance and form no part of the present invention; however, the novelty resides in applicants' combination of these convolutional codes with their inner codes.

TABLE 1

| | NEW COMBINED RATE 1/2 AND RATE 3/6 CODES USING IC1 AND IC2 | | | | |
|---|---|---|---|---|---|
| No. States | 2 | 8 | 16 | 64 | 128 |
| Coding Gains | 4.8 dB | 6 dB | 7 dB | 7.8 dB | $\geq$ 7.8 dB |
| $d_{free}^2$ | 6 | 8 | 10 | 12 | $\geq$ 12 |
| ZRL | 1 | 2 | 2 | 2 | 2 |
| Inner Code | IC1 | IC2 | IC2 | IC2 | IC2 |
| Final Rate | 1/2 | 3/6 | 3/6 | 3/6 | 3/6 |
| $d^H$ | 1 | 3 | 4 | 5 | 6 |
| G(D) | 1 | $\begin{bmatrix} 1 & 1 & 1 & 1 \\ 1 & 2 & 0 & 1 \\ 2 & 0 & 1 & 1 \end{bmatrix}$ | $\begin{bmatrix} 4 & 4 & 4 & 4 \\ 0 & 6 & 2 & 4 \\ 0 & 2 & 5 & 5 \end{bmatrix}$ | $\begin{bmatrix} 6 & 2 & 2 & 6 \\ 1 & 6 & 0 & 7 \\ 0 & 2 & 5 & 5 \end{bmatrix}$ | $\begin{bmatrix} 6 & 1 & 0 & 7 \\ 3 & 4 & 1 & 6 \\ 2 & 3 & 7 & 4 \end{bmatrix}$ |

Uses a variant to IC2, $x_1x_2 \rightarrow x_1\bar{x}_1x_2$

In connection with Table 1, the actual free distance was found by path-to-path distance calculation using the Viterbi algorithm on a trellis with the square of the number of states of the decoder, whenever this was computationally feasible (no more than 16 decoder states). In other cases, a lower bound based on subset distances was computed using a trellis with the same number of states as the decoder.

Tables 2 and 3 give some of the codes found using the inner codes IC3 and IC4. These rate 2/4 and rate 4/8 trellis codes may be preferable to rate 3/6 codes in byte-oriented data processing systems.

TABLE 2

| NEW COMBINED RATE 2/4 CODE USING IC3 | | | | |
|---|---|---|---|---|
| No. States | 8 | 16 | 32 | 64 |
| Coding Gains | 4.8 dB | 6 dB | — | 7 dB |
| $d_{free}^2$ | 6 | 8 | — | 10 |
| ZRL | 3 | 3 | — | 3 |
| Inner Code | IC3 | IC3 | — | IC3 |
| Final Rate | 2/4 | 2/4 | — | 2/4 |

TABLE 2-continued values of $d_{free}^2$ shown are lower bounds, and that coding gains ranging from 7 dB to 11.1 dB are achieved.

TABLE 4

NEW COMBINED RATE 3/8 CODES USING IC1

| No. States | 4 | 8 | 16 | 64 | 128 |
|---|---|---|---|---|---|
| Coding Gains | 7 dB | 8.5 dB | 9.5 dB | 10.4 dB | 11.1 dB |
| $d_{free}^2$ | 10 | 14 | 18 | 22 | 26 |
| ZRL | 1 | 1 | 1 | 1 | 1 |
| $d^H$ | 2 | 3 | 4 | 5 | 6 |
| G(D) | $\begin{bmatrix} 1 & 0 & 1 & 0 \\ 0 & 1 & 0 & 1 \\ 6 & 6 & 0 & 1 \end{bmatrix}$ | $\begin{bmatrix} 1 & 1 & 1 & 1 \\ 1 & 2 & 0 & 1 \\ 2 & 0 & 1 & 1 \end{bmatrix}$ | $\begin{bmatrix} 4 & 4 & 4 & 4 \\ 0 & 6 & 2 & 4 \\ 0 & 2 & 5 & 5 \end{bmatrix}$ | $\begin{bmatrix} 6 & 2 & 2 & 6 \\ 1 & 6 & 0 & 7 \\ 0 & 2 & 5 & 5 \end{bmatrix}$ | $\begin{bmatrix} 6 & 1 & 0 & 7 \\ 3 & 4 & 1 & 6 \\ 2 & 3 & 7 & 4 \end{bmatrix}$ |

NEW COMBINED RATE 2/4 CODE USING IC3

| No. States | 8 | 16 | 32 | 64 |
|---|---|---|---|---|
| $d^H$ | 3 | 4 | — | 6 |
| G(D) | $\begin{bmatrix} 6 & 2 & 6 \\ 2 & 4 & 4 \end{bmatrix}$ | $\begin{bmatrix} 4 & 2 & 6 \\ 1 & 4 & 7 \end{bmatrix}$ | — | $\begin{bmatrix} 60 & 30 & 70 \\ 14 & 40 & 74 \end{bmatrix}$ |

TABLE 3

EXAMPLE 3

If IC1 is concatenated with rate 3/4 codes, a family of rate 2/6 is obtained, as described in Table 5. The values of $d_{free}^2$ shown are lower bounds. At this lower rate, coding gains ranging from 10.4 dB to 12.3 dB are achieved with the number of decoder states ranging from 32 to 256.

TABLE 5

NEW COMBINED RATE 2/6 CODES USING IC1

| No. States | 32 | 64 | 128 | 256 |
|---|---|---|---|---|
| Coding Gains | 10.4 dB | 11.1 dB | 11.8 dB | 12.3 dB |
| $d_{free}^2$ | 22 | 26 | 30 | 34 |
| ZRL | 1 | 1 | 1 | 1 |
| $d^H$ | 5 | 6 | 7 | 8 |
| G(D) | $\begin{bmatrix} 7 & 1 & 4 \\ 2 & 5 & 7 \end{bmatrix}$ | $\begin{bmatrix} 60 & 30 & 70 \\ 14 & 40 & 74 \end{bmatrix}$ | $\begin{bmatrix} 64 & 30 & 64 \\ 30 & 64 & 74 \end{bmatrix}$ | $\begin{bmatrix} 60 & 34 & 54 \\ 16 & 46 & 74 \end{bmatrix}$ |

NEW COMBINED RATE 4/8 CODES USING IC4

| No. States | 16 |
|---|---|
| Coding Gains | 7 dB |
| $d_{free}^2$ | 10 |
| ZRL | 3 |
| Inner Code | IC4 |
| Final Rate | 4/8 |
| $d^H$ | 3 |
| G(D) | 4 0 4 4 4 |
| | $\begin{bmatrix} 0 & 0 & 4 & 2 & 6 \\ 4 & 4 & 6 & 4 & 2 \end{bmatrix}$ |
| | 4 6 0 2 2 |

Selected Concatenated Convolutional Codes and Inner Codes with Combined Rate Less than ½

In this section, inner code IC1 is used to construct trellis codes for (1−D), for selected combined rates less than ½. Note that several of the codes exhibit very large coding gains at moderate complexity for rates between ⅓ and ½.

EXAMPLE 1

If IC1 is concatenated with a rate 4/5 convolutional code, with constraint length $\nu=3$, and free Hamming distance $d_{free}^H=3$, a rate 4/10 code is obtained, with a 16-state decoder, ZRL 1, and free Euclidean distance $d_{free}^2 \geq 14$. This corresponds to an 8.5 dB coding gain over the uncoded channel, unnormalized for rate.

EXAMPLE 2

If IC1 is concatenated with rate ¾ codes, a family of rate ⅜ is obtained, as described in Table 4. Note that the Channels with transfer polynomial $(1-D^N)$ have been discussed in connection with interleaved channels. However, it will be understood by those skilled in the art that the resulting codes can be modified for use on a $(1+D^N)$ channel, by converting a code for the $(1-D)$ channel to a code with the same coding gain for a $(1+D)$ channel by adding the vector 01010101 ... or 10101010 ....

Viterbi Decoder Implementations for Combined Rate ½ Codes for Interleaved Channels This section addresses the issue of Viterbi decoder implementation and compares the required hardware complexity of the new codes to that of previously proposed codes with comparable coding gain. The computational and storage requirements are estimated for decoding a rate k/n code based upon a trellis structure with s states.

Assume a parallel architecture for the Viterbi decoder similar to that commonly used. The decoder comprises two sections. The first section generates the survivor sequences and consists of a subunit that computes branch metrics, along with Add-Compare-Select (ACS) subprocessors replicated and interconnected to reflect the trellis structure.

The branch metric calculation, with appropriate use of ROM, requires approximately n additions per edge in the trellis. The ACS subprocessor performs $2^k$ two-way additions to generate the extended path metrics, a $2^k$-way comparison to determine the minimum metric, and a $2^k$-way multiplexing operation to select the corresponding sequence and updated metric. The ACS block is replicated s times, once for each state. Assuming that an adder has complexity $\alpha$, a $2^k$-way comparator has complexity $\beta 2^k$ and that a $2^k$-to-1 multiplexer has complexity $\gamma 2^k$, then an approximate measure of the complexity of the first section, normalized to a "per decoded bit" basis, is $$V_1 = (\alpha n + \beta + \gamma)s2^k$$

The second section is the trellis paths history, which stores survivor sequences for each trellis state to a depth adequate to ensure a high probability of path merging. It stores the survivor sequences in a set of s shift registers, each of length approximately five times the constraint length of the code, to ensure path merging. The registers are interconnected by a series of $2^k$-way multiplexers inserted after every n shift register stages. These enable the correct updating of survivor sequences. If the complexity of a single shift register stage (usually a flip-flop) is $\delta$, the required hardware complexity is approximately given by the quantity $$V_2 = (\delta n + \gamma 2^k)s\log_2 s$$

When these complexity measures are computed for the rate ½ codes in the Prior Art and applicants' new rate ½ and rate 3/6 codes in Table 1, the results favor the new codes by substantial margins, as shown in Table 6.

ably with the complexity measures for the corresponding rate ½ code.

If these prior art rate ½ codes are blocked for use as rate 2/4, 3/6 or 4/8 codes to achieve possible speed advantages of block processing in Viterbi decoding, applicants' codes provide further significant reductions in the hardware requirements, as illustrated in Table 7 for the rate ½ and rate 3/6 codes.

TABLE 7

| COMPARISON OF DECODER COMPLEXITY (BLOCKED 3/6) | | | |
|---|---|---|---|
| Coding Gains | 4.8 dB | 6 dB | 7 dB |
| $d_{free}^2$ | 6 | 8 | 10 |
| States | | | |
| (Prior Art) | 8 | 32 | 64 |
| (Table 1) | 2 | 8 | 16 |
| ZRL | | | |
| (Prior Art) | 6 | 10 | 14 |
| (Table 1) | 1 | 2 | 2 |
| $V_1$ | | | |
| (Prior Art) | $(6\alpha + \beta + \gamma)64/3$ | $(6\alpha + \beta + \gamma)256/3$ | $(6\alpha + \beta + \gamma)512/3$ |
| (Table 1) | $(6\alpha + \beta + \gamma)16/3$ | $(6\alpha + \beta + \gamma)64/3$ | $(6\alpha + \beta + \gamma)128/3$ |
| $V_2$ | | | |
| (Prior Art) | $(6\delta + 8\gamma)24$ | $(6\delta + 8\gamma)160$ | $(6\delta + 8\gamma)384$ |
| (Table 1) | $(6\delta + 8\gamma)2$ | $(6\delta + 8\gamma)24$ | $(6\delta + 8\gamma)64$ |

Viterbi Decoder Implementations for Interleaved Biphase Code on the EPR4 Channel In this section, a difference metric Viterbi decoding algorithm is derived for interleaved biphase (IB) code on the EPR4 channel with transfer polynomial $(1-D)(1+D)^2$. Bounds are given on the size of the difference metrics at step n. These bounds lead to a decoder implementation that does not require renormalization.

Figure 2:
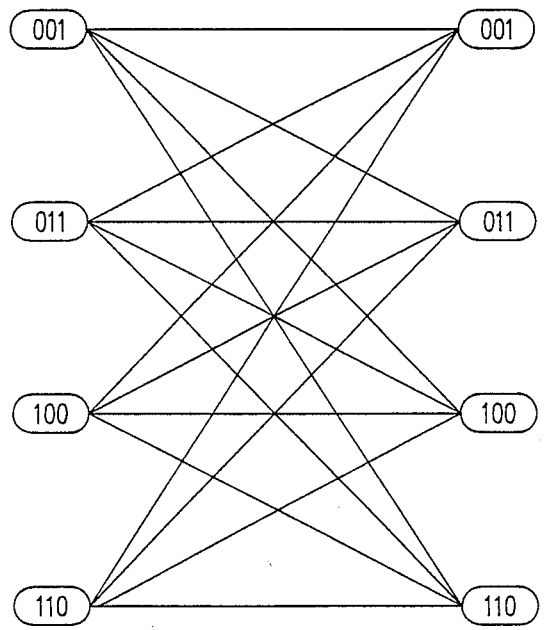
FIG. 2 is a trellis diagram, according to one specific embodiment of the invention, for interleaved biphase code used with "extended" class 4 partial response channels.

FIG. 2 depicts the four-state trellis upon which the Viterbi decoding algorithm operates. The state names represent the contents of the channel memory (3 bits) and the edge labels are $$x_1 x_2 \bar{x}_1 \bar{x}_2 / c_1 c_2 c_3 c_4$$

where $x_1 x_2 \bar{x}_1 \bar{x}_2$ is the IB codeword and $c_1 c_2 c_3 c_4$ is the corresponding channel output sequence. Note that the

TABLE 6

| COMPARISON OF DECODER COMPLEXITY (UNBLOCKED) | | | |
|---|---|---|---|
| Coding Gains | 4.8 dB | 6 dB | 7 dB |
| $d_{free}^2$ | 6 | 8 | 10 |
| States | | | |
| (Prior Art) | 8 | 32 | 64 |
| (Table 1) | 2 | 8 | 16 |
| ZRL | | | |
| (Prior Art) | 6 | 10 | 14 |
| (Table 1) | 1 | 2 | 2 |
| $V_1$ | | | |
| (Prior Art) | $(2\alpha + \beta + \gamma)16$ | $(2\alpha + \beta + \gamma)64$ | $(2\alpha + \beta + \gamma)128$ |
| (Table 1) | $(2\alpha + \beta + \gamma)4$ | $(6\alpha + \beta + \gamma)64/3$ | $(6\alpha + \beta + \gamma)128/3$ |
| $V_2$ | | | |
| (Prior Art) | $(2\delta + 2\gamma)24$ | $(2\delta + 2\gamma)160$ | $(2\delta + 2\gamma)384$ |
| (Table 1) | $(2\delta + 2\gamma)2$ | $(6\delta + 8\gamma)24$ | $(6\delta + 8\gamma)64$ |

Prior Art = References [A], [B] or [C];
Table 1 = IC1 and IC2 Codes
$V_1$ = Metric Complexity
$V_2$ = Path History Complexity While the complexity measures for the rate 2/4 code with 16-state decoder and coding gain of 6 dB shown in Table 2 has not been here calculated, it compares favor-channel input equals the code output.

To determine the optimal path extensions, it suffices to keep track of three difference survivor metrics, $DJ_n(2,1)$, $DJ_n(3,1)$ and $DJ_n(4,1)$. These path extensions, as well as the corresponding difference metric conditions which govern their selection are shown in Table 8 below. The conditions take the form of inequalities involving the three quantities $$a_n = DJ_{n1}(2,1) = 2y_n^1 = 2y_n^2$$

$$b_n = DJ_{n-1}(3,1) = 4y_n^1 - 2y_n^2 - 2y_n^3$$

$$c_n = DJ_{n-1}(4,1) = 6y_n^1 - 2y_n^3$$

which depend only on the difference metric values $DJ_{n-1}(2,1)$, $DN_{n-1}(3,1)$ and $DJ_{n-1}(4,1)$ at step $n-1$ and the channel output samples $y_n^1$, $y_n^2$, $y_n^3$, $y_n^4$ at time n.

Table 8 is broken into four subtables, 8a-d, each describing the algorithm for generating the survivor for one of the trellis states at time n.

TABLE 8a

COMPUTATION OF SURVIVOR SEQUENCE FOR STATE 1

| Inequality | Extension |
|---|---|
| $a_n \geq 2$ and $b_n \geq 6$ and $c_n \geq 6$ | |
| $a_n < 2$ and $b_n - a_n \geq 4$ and $c_n - a_n \geq 4$ | |
| $b_n < 6$ and $b_n - a_n < 4$ and $c_n - b_n \geq 0$ | |
| $c_n < 6$ and $c_n - a_n < 4$ and $c_{n-bn} < 0$ | |

TABLE 8b

COMPUTATION OF SURVIVOR SEQUENCE FOR STATE 2

| Inequality | Extension |
|---|---|
| $a_n \geq -2$ and $b_n \geq 0$ and $c_n \geq -4$ | |
| $a_n < -2$ and $b_n - a_n \geq 2$ and $c_n - a_n \geq -2$ | |
| $b_n < 0$ and $b_n - a_n < 2$ and $c_n - b_n \geq -4$ | |
| $c_n < -4$ and $c_n - a_n < -2$ and $c_{n-bn} < -4$ | |

TABLE 8c

COMPUTATION OF SURVIVOR SEQUENCE FOR STATE 3

| Inequality | Extension |
|---|---|
| $a_n \geq 4$ and $b_n \geq 2$ and $c_n \geq 4$ | |
| $a_n < 4$ and $b_n - a_n \geq -2$ and $c_n - a_n \geq 0$ | |
| $b_n < 2$ and $b_n - a_n < -2$ and $c_n - b_n \geq 2$ | |
| $c_n < 4$ and $c_n - a_n < 0$ and $c_{n-bn} < 2$ | |

TABLE 8d

COMPUTATION OF SURVIVOR SEQUENCE FOR STATE 4

| Inequality | Extension |
|---|---|
| $a_n \geq 0$ and $b_n \geq -4$ and $c_n \geq -6$ | |
| $a_n < 0$ and $b_n - a_n \geq -4$ and $c_n - a_n \geq -6$ | |
| $b_n < -4$ and $b_n - a_n < -4$ and $c_n - b_n \geq -2$ | |
| $c_n < -6$ and $c_n - a_n < -6$ and $c_{n-bn} < -2$ | |

The difference metric updates are easily computed once the path extensions have been made. To compute $DJ_n(s,t)$, the following technique is used. Assume that the time n survivor sequences for s and t are obtained by extending the time $n-1$ survivor sequences for u and v, respectively. If $z_1, z_2, z_3, z_4$ are the ideal EPR4 output samples which label the edge from u to s, and $w_1, w_2, w_3, w_4$ are the ideal EPR4 output samples which label the edge from v to t, then $$DJ_n(s,t) = DJ_{n-1}(u,v) - 2 \sum_{i=1}^{4} (z_i - w_i) y_i + \sum_{i=1}^{4} (z_i^2 - w_i^2)$$

As mentioned above, only the difference metrics $DJ_n(2,1)$, $DJ_n(3,1)$ and $DJ_n(4,1)$ need be updated. Any quantities $DJ_{n-1}(u,v)$ required in the update process can be obtained from a linear combination of $DJ_{n-1}(2,1)$, $DJ_{n-1}(3,1)$ and $DJ_{n-1}(4,1)$.

With the output sample normalization chosen such that ideal EPR4 sample values are in $[-2,2]$, it can be assumed that the digitized signal samples fall in a range $[-A,A]$. The following bounds on the quantities $DJ_n(2,1)$ and $DJ_n(3,1)$ can then be computed as $$-12A - 2 \leq DJ_n(2,1) \leq 12A + 8$$

$$-8A \leq DJ_n(3,1) \leq 8A + 6$$

$$-8A - 6 \leq DJ_n(4,1) \leq 8A + 6$$

For example, taking $A=4$, the bounds show that $DJ_n(2,1)\epsilon[-50,56]$, $DJ_n(3,1)\epsilon[-32,38]$ and $DJ_n(4,1)\epsilon[-38,38]$. If there are $L=2^r$ quantization levels between ideal sample values, then, at most, $6+r$ magnitude bits and 1 sign bit are required to store the difference metrics.

It will now be seen that the coding techniques according to the invention provide coding gains of at least 4.8 dB with reduced hardware complexity, representing a significant improvement over prior art techniques. As illustrated, the improved coding gains range from 4.8 dB for two states to 12.3 dB for 256 states. The improved trellis codes provide reliable data transmission over noisy partial response channels with transfer polynomials $(1 \pm D^N)$ and also with transfer polynomial $(1-D)(1+D)^2$ EPR4 channels.

It will also be seen that the concatenated codes with combined rate ½ obtained using the techniques and method embodying the invention for inner codes IC1, IC2, IC3 and IC4 and coding gains ranging from 4.8 dB to 7.8 dB typically require significantly fewer decoder states (by factors of 2 to 4) than the previously known codes. Also, significant reductions in decoder hardware are achieved compared with previously known codes, and the ZRL constraints are substantially improved in all cases.

Moreover, it is to be understood that while only codes with combined rates of at least ½ have been disclosed, codes of lesser rate may be achieved by repeating, for example, the $IC_1$ codes to provide a modified code $IC_1'$ wherein $x_1 x_2 \rightarrow x_1 \bar{x}_2 x_2 x_1 x_2 x_2$ and thereby achieve a combined code rate of ⅓. In similar fashion, $IC_3$, if similarly modified, would provide a $IC_3'$ with a combined rate of ⅜; and $IC_4$, if similarly modified, would provide a $IC_4'$ with a combined rate of 5/16.

Also, the inner code could be repeated more than once. For example, if $IC_1$ were repeated twice, then a modified code would be provided wherein $x_1 \rightarrow x_1 \bar{x}_1 x_1 \bar{x}_1 x_1 \bar{x}_1$ and the combined code rate would thus be 1/6.

Finally, it will be seen that in applicants' novel technique, the combined code rate is the product of the convolutional code rate and inner code rate, that the combined code rate can be changed as desired by modifying either to affect said product, and that by either approach significantly higher coding gains can be obtained than heretofore achieved.

APPENDIX

I. General Description of Euclidean Distance Equations for Interleaved Channels Let $\underline{x}=(x_i)$ and $\underline{x}'=(x_1')$ be binary input sequences to the $(1-D)$ channel, with symbols in $\{0,1\}$. Denote the corresponding output sequences by $\underline{y}$ and $\underline{y}'$, with $$Y_i = x_i - x_{i-1}$$

$$Y_1' = x_i' - x_{i-1}'$$

The squared Euclidean distance between $\underline{y}$ and $\underline{y}'$ can be written as:

$$\begin{aligned} d_E^2(\underline{y},\underline{y}') &= \sum_i (y_i - y'_i)^2 \quad (A1)\\ &= \sum_i ((x_i - x_{i-1}) - (x'_i - x'_{i-1}))^2 \\ &= \sum_i ((x_i - x'_i) - (x_{i-1} - x'_{i-1}))^2 \\ &= \sum_i (x_i - x'_i)^2 + \sum_i (x_{i-1} - x'_{i-1})^2 \\ &\quad - 2\sum_i (x_i - x'_i)(x_{i-1} - x'_{i-1}) \end{aligned}$$

The first two terms in Equation (A1) each contribute 1 to the Euclidean distance for each component in which $\underline{x}$ and $\underline{x}'$ differ. Therefore, $$\Sigma(x_i - x_i')^2 + \Sigma(x_{i-1} - x_{i-1}')^2 = 2d_H(\underline{x},\underline{x}'),$$

where $d_H$ denotes Hamming distance. The last term in Equation (A1) contributes to $d_E^2$ in the following way:

$$(x_i - x'_i)(x_{i-1} - x'_{i-1}) = \begin{cases} 1 & \text{if } \begin{bmatrix} x_{i-1} x_i \\ x'_{i-1} x'_i \end{bmatrix} = \begin{bmatrix} 0 & 0 \\ 1 & 1 \end{bmatrix} \text{or} \begin{bmatrix} 1 & 1 \\ 0 & 0 \end{bmatrix} \\ -1 & \text{if } \begin{bmatrix} x_{i-1} x_i \\ x'_{i-1} x'_i \end{bmatrix} = \begin{bmatrix} 0 & 1 \\ 1 & 0 \end{bmatrix} \text{or} \begin{bmatrix} 1 & 0 \\ 0 & 1 \end{bmatrix} \\ 0 & \text{otherwise} \end{cases}$$

Equation (A1) can therefore be rewritten as:

$$d_E^2(\underline{y},\underline{y}') = 2d_H(\underline{x},\underline{x}') + 2d_G(\underline{x},\underline{x}') - 2d_B(\underline{x},\underline{x}') \quad (A2)$$

where $$d_G(\underline{x},\underline{x}') = \# \text{ occurrences of } \begin{bmatrix} x_{i-1} x_i \\ x'_{i-1} x'_i \end{bmatrix} = \begin{bmatrix} 0 & 1 \\ 1 & 0 \end{bmatrix} \text{or} \begin{bmatrix} 1 & 0 \\ 0 & 1 \end{bmatrix}$$

and $$d_B(\underline{x},\underline{x}') = \# \text{ occurrences of } \begin{bmatrix} x_{i-1} x_i \\ x'_{i-1} x'_i \end{bmatrix} = \begin{bmatrix} 0 & 0 \\ 1 & 1 \end{bmatrix} \text{or} \begin{bmatrix} 1 & 1 \\ 0 & 0 \end{bmatrix}$$

Equation (A2) suggests that an inner code which combines bit repetition and inversion appropriately could generate large Euclidean distance, both by increasing the $d_H$ term and by contributing via the $d_G$ term.

II. Derivation of Bound on $d_{free}^2$ for IC1

First, examine the rate ½ inner code denoted IC1, defined by $$x \rightarrow x\bar{x}$$

This is the conventional biphase modulation code, used here in a new context.

Let $\underline{x}$ and $\underline{x}'$ denote inputs to the IC1 encoder, and let $\underline{u}$ and $\underline{u}'$ denote the corresponding outputs. Then, $$d_H(\underline{u},\underline{u}') = 2d_H(\underline{x},\underline{x}')$$

and $$d_G(u,u') - d_B(u,u') \geq 1, \text{ if } d_H(\underline{u},\underline{u}') < \infty$$

with the inequality arising from the fact that any contribution to $d_B$ is bracketed by contributions to $d_G$ on either side.

From Equation (A1), it follows that if $\underline{x}$ is generated by a rate k/n convolutional code with free Hamming distance $d_{free}^H$, then the inner code IC1 will yield a rate k/2n trellis code with free Euclidean distance $d_{free}^2$ bounded by:

$$d_{free}^2 \geq 4d_{free}^H + 2$$

which is the bound given in Equation (1) of the specification.

III. Derivation of Bound on $d_{free}^2$ for IC2

To obtain higher rate codes, next consider a rate $\frac{2}{3}$ inner code IC2 defined by $$x_1 x_2 \rightarrow x_1 x_2 \bar{x}_2$$

By examining the possible bit patterns for $$\begin{bmatrix} x_1 x_2 \bar{x}_2 x_3 \\ x'_1 x'_2 \bar{x}'_2 x'_3 \end{bmatrix}$$

it is noted that within this window, the contributions $\Delta_G$ to $d_G(\underline{u},\underline{u}')$, $\Delta_B$ to $d_B(\underline{u},\underline{u}')$, and $\Delta_H$ to $d_H(\underline{u},\underline{u}') - d_H(\underline{x},\underline{x}')$ satisfy $$\Delta_H + \Delta_G - \Delta_B \geq 0 \quad (A3)$$

implying that $$(d_H(\underline{u},\underline{u}') - d_H(\underline{x},\underline{x}')) + d_G(\underline{u},\underline{u}') - d_B(\underline{u},\underline{u}') \geq 0$$

From Equation (A1) the bound on $d_{free}^2$ for IC2 is derived, as stated in Equation (2) of the specification.

$$d_{free}^2 \geq 2d_{free}^H \quad (A4)$$

By examining the minimum distance patterns of the underlying convolutional codes C to determine the presence or absence of patterns for which Equation (A3) is an equality, namely $$\begin{bmatrix} 1 & 1 & 0 & 0 \\ 0 & 0 & 1 & 1 \end{bmatrix} \text{ and } \begin{bmatrix} 0 & 0 & 1 & 1 \\ 1 & 1 & 0 & 0 \end{bmatrix}$$

it is possible to explain the discrepancies between the actual $d_{free}^2$ and the bound Equation (A4), such as those found in Table 1 for the 16 state and 64 state, rate 3/6 codes. A similar analysis explains the discrepancy in the 8-state, rate 3/6 code derived from the variant of inner code IC2.

IV. General Derivation of Euclidean Distance Equation for EPR4 Channel

First develop an expression for the squared Euclidean distance between two output sequences of the EPR4 channel, analogous to the derivation for the (1−D) channel above. Let $\underline{x} = (x_i)$ and $\underline{x}' = (x_i')$ be binary input sequences, with symbols in $\{0,1\}$, for the EPR4 channel, with channel polynomial $(1+D-D^2-D^3)$. Denote the corresponding output sequences by $\underline{y}$ and $\underline{y}'$, with $$y_i = x_i + x_{i-1} - x_{i-2} - x_{i-3}$$

$$y_i' = x_i' + x_{i-1}' - x_{i-2}' - x_{i-3}'$$

The squared Euclidean distance between $\underline{y}$ and $\underline{y}'$ can be written as:

$$\begin{aligned}
d_E^2(\underline{y},\underline{y}') &= \sum_i (y_i - y_i')^2 \qquad (A5)\\
&= \sum_i ((x_i + x_{i-1} - x_{i-2} - x_{i-3}) - (x_i' + x_{i-1}' - x_{i-2}' - x_{i-3}'))^2 \\
&= \sum_i ((x_i - x_i') + (x_{i-1} - x_{i-1}') - (x_{i-2} - x_{i-2}') - (x_{i-3} - x_{i-3}'))^2 \\
&= \sum_i (x_i - x_i')^2 + \Sigma(x_{i-1} - x_{i-1}')^2 + \Sigma(x_{i-2} - x_{i-2}')^2 + \Sigma(x_{i-3} - x_{i-3}')^2
\end{aligned}$$

$$+2\sum_i (x_i - x_i')(x_{i-1} - x_{i-1}') - 2\sum_i (x_{i-1} - x_{i-1}')(x_{i-2} - x_{i-2}') + 2\sum_i (x_{i-2} - x_{i-2}')(x_{i-3} - x_{i-3}') \quad (A6)$$

$$-2\sum_i (x_i - x_i')(x_{i-2} - x_{i-2}') - 2\sum_i (x_{i-1} - x_{i-1}')(x_{i-3} - x_{i-3}') \quad (A7)$$

$$-2\sum_i (x_i - x_i')(x_{i-3} - x_{i-3}') \quad (A8)$$

The four terms in Equation (A5) each contribute 1 to the Euclidean distance for each component in which $\underline{x}$ and $\underline{x}'$ differ. Therefore, the total contribution from Equation (A5) is $$4d_H(\underline{x},\underline{x}') \quad (A9)$$

The next three terms in Equation (A6) contribute to $d_E^2$ in the following way:

$$(x_i - x_i')(x_{i-1} - x_{i-1}') = \begin{cases} 1 & \text{if } \begin{bmatrix} x_{i-1} x_i \\ x_{i-1}' x_i' \end{bmatrix} = \begin{bmatrix} 0 & 0 \\ 1 & 1 \end{bmatrix} \text{ or } \begin{bmatrix} 1 & 1 \\ 0 & 0 \end{bmatrix} \\ -1 & \text{if } \begin{bmatrix} x_{i-1} x_i \\ x_{i-1}' x_i' \end{bmatrix} = \begin{bmatrix} 0 & 1 \\ 1 & 0 \end{bmatrix} \text{ or } \begin{bmatrix} 1 & 0 \\ 0 & 1 \end{bmatrix} \\ 0 & \text{otherwise} \end{cases}$$

Equation (A6) can therefore be rewritten as $$-2(d_G^{(1)}(\underline{x},\underline{x}') - d_B^{(1)}(\underline{x},\underline{x}')) \quad (A10)$$

where $$d_G^{(1)}(\underline{x},\underline{x}') = \text{\# occurrences of } \begin{bmatrix} x_{i-1} x_i \\ x_{i-1}' x_i' \end{bmatrix} = \begin{bmatrix} 0 & 1 \\ 1 & 0 \end{bmatrix} \text{ or } \begin{bmatrix} 1 & 0 \\ 0 & 1 \end{bmatrix}$$

-continued
and $$d_B^{(1)}(\underline{x},\underline{x}') = \text{\# occurrences of } \begin{bmatrix} x_{i-1}x_i \\ x'_{i-1}x'_i \end{bmatrix} = \begin{bmatrix} 0 & 0 \\ 1 & 1 \end{bmatrix} \text{ or } \begin{bmatrix} 1 & 1 \\ 0 & 0 \end{bmatrix}$$

Similarly, the contribution from Equation (A3) can be expressed as $$4(d_G^{(2)}(\underline{x},\underline{x}') - d_B^{(2)}(\underline{x},\underline{x}')) \quad (A11)$$

where $$d_G^{(2)}(\underline{x},\underline{x}') = \text{\# occurrences of } \begin{bmatrix} x_{i-2}x_i \\ x'_{i-2}x'_i \end{bmatrix} = \begin{bmatrix} 0 & 1 \\ 1 & 0 \end{bmatrix} \text{ or } \begin{bmatrix} 1 & 0 \\ 0 & 1 \end{bmatrix}$$

and $$d_B^{(2)}(\underline{x},\underline{x}') = \text{\# occurrences of } \begin{bmatrix} x_{i-2}x_i \\ x'_{i-2}x'_i \end{bmatrix} = \begin{bmatrix} 0 & 0 \\ 1 & 1 \end{bmatrix} \text{ or } \begin{bmatrix} 1 & 1 \\ 0 & 0 \end{bmatrix}$$

Finally, the contribution from Equation (A4) is $$2(d_G^{(3)}(\underline{x},\underline{x}') - d_B^{(3)}(\underline{x},\underline{x}')) \quad (A12)$$

where $$d_G^{(3)}(\underline{x},\underline{x}') = \text{\# occurrences of } \begin{bmatrix} x_{i-3}x_i \\ x'_{i-3}x'_i \end{bmatrix} = \begin{bmatrix} 0 & 1 \\ 1 & 0 \end{bmatrix} \text{ or } \begin{bmatrix} 1 & 0 \\ 0 & 1 \end{bmatrix}$$

and $$d_B^{(3)}(\underline{x},\underline{x}') = \text{\# occurrences of } \begin{bmatrix} x_{i-3}x_i \\ x'_{i-3}x'_1 \end{bmatrix} = \begin{bmatrix} 0 & 0 \\ 1 & 1 \end{bmatrix} \text{ or } \begin{bmatrix} 1 & 1 \\ 0 & 0 \end{bmatrix}$$

Therefore, the total $d_E^2$ can be expressed as $$d_{free}^2(\underline{y},\underline{y}') = 4d_H(\underline{x},\underline{x}') + 4(d_G^{(2)}(\underline{x},\underline{x}') - d_B^{(2)}(\underline{x},\underline{x}')) + 2(d_G^{(3)}(\underline{x},\underline{x}') - d_B^{(3)}(\underline{x},\underline{x}')) - 2(d_G^{(1)}(\underline{x},\underline{x}') - d_B^{(1)}(\underline{x},\underline{x}')) \quad (A13)$$

Equation (A13) suggests that an inner code which combines bit repetition and inversion in even and odd substrings might generate large Euclidean distance, both by increasing the $d_H$ term and by contributing via the $d_G^{(2)}$ term.

V. Derivation of Bound for $d_{free}^2$ of Interleaved Biphase Code with EPR4 Channel Examine the rate ½ inner code which has been denoted IB, defined by $$x_1x_2 \rightarrow x_1x_2\bar{x}_1\bar{x}_2$$

Let $\underline{x}$ and $\underline{e}$ denote inputs to the IB encoder, and let $\underline{u}$ and $\underline{u}'$ denote the corresponding outputs. Use subscripts "e" and "o" to denote even and odd substrings respectively. To prove the bound stated in Equation (4) of the specification, consider two cases.

Case 1: $(d_G^{(1)} - d_B^{(1)}) = (d_G^{(3)} - d_B^{(3)}) = 0$

If $\underline{x} \neq \underline{x}'$, then either $d_H(\underline{u}_e,\underline{u}_e') \neq 0$ or $d_H(\underline{u}_o,\underline{u}_o') \neq 0$.
Without loss of generality, assume $d_H(\underline{u}_e,\underline{u}_e') \neq 0$.
Then, since IB acts like the biphase code on $\underline{x}_e$ and $\underline{x}_e'$, the argument in Section I hereof shows that $$d_G^{(2)}(\underline{u},\underline{u}') - d_B^{(2)}(\underline{u},\underline{u}') \geq 1$$

so $$d_{free}^2(\underline{y},\underline{y}') \geq 4d_H(\underline{u},\underline{u}') + 4 = 8d_H(\underline{x},\underline{x}') + 4$$

If both $d_H(\underline{e}_e,\underline{u}_e')$ and $d_H(\underline{u}_o,\underline{u}_o')$ are nonzero, then $$d_G^{(2)}(\underline{u},\underline{u}') - d_B^{(2)}(\underline{u},\underline{u}') \geq 2$$

implying $$d_{free}^2(\underline{y},\underline{y}') \geq 8d_H(x_e,x_e') + 4 + 8d_H(x_o,x_o') + 4 = 8d_H(x,x') + 8$$

Case 2: $(d_G^{(1)} - d_B^{(1)}) \neq 0$ or $(d_G^{(3)} - d_B^{(3)}) \neq 0$

The assumption forces $d_H(\underline{u}_e,\underline{u}_e')$ and $d_H(\underline{u}_o,\underline{u}_o')$ to be nonzero, so use the remark at the end of case 1 to get $$d_G^{(2)}(\underline{u},\underline{u}') - d_B^{(2)}(\underline{u},\underline{u}') \geq 2$$

Since the combined contributions of $d^{(1)}$ and $d^{(3)}$ can be at worst $-4$ for each position which contributes to $d_H(\underline{x},\underline{x}')$, it can be concluded $$d_{free}^2(\underline{y},\underline{y}') \geq 4d_H(\underline{x},\underline{x}') + 8$$

It follows that if $\underline{x}$ is generated by a rate k/n binary convolutional code with free Hamming distance $d_{free}^H$, then inner code IB will produce a rate k/2n trellis code with free Euclidean distance $d_{free}^2$ bounded by:

$$d_{free}^2 \geq \min\{8d_{free}^H + 4, 4d_{free}^H + 8\}$$

which agrees with Equation (4) in the specification.

We claim:
1. A method for coding input strings to improve reliability of partial response channels, comprising the steps of:
   (a) encoding an input string into an intermediate string using a binary convolution code; and
   (b) encoding said intermediate string using a nonlinear inner code that repeats and inverts selected bits of said intermediate string; said inner code having a coding rate of less than one.
2. A method according to claim 1, including steps of: concatenating the convolutional code and inner code to produce a combined code rate, the magnitude of which is the product of the convolutional code rate and inner code rate; and
   modifying the convolutional code rate and/or inner code rate, for improving coding gain.
3. A method according to claim 1, wherein coding gain is at least 4.8 dB and maximum zero run length (ZRL) does not exceed 3.
4. A method according to claim 1, wherein both the inner code and the channels are interleaved.
5. A method according to claim 1, including the step of employing a channel transfer polynomial of $(1-D^N)$.
6. A method according to claim 5, wherein N is 2.
7. A method according to claim 1, including the step of employing a channel transfer polynomial of $(1+D^N)$.
8. A method according to claim 1, including concatenating an inner code of rate ½ on a $(1 \pm D)$ channel with rate 1 convolutional code to provide a combined code with rate ½ and a maximum zero run length (ZRL) of 1.
9. A method according to claim 1, including concatenating an inner code of rate ⅔ on a $(1 \pm D)$ channel with rate ¾ convolutional code to provide a combined code with rate 3/6 and maximum zero run length (ZRL) of 2.

10. A method according to claim 1, including concatenating an inner code of rate ¾ on a $(1 \pm D)$ channel with rate ⅔ convolutional code to provide a combined code with rate 2/4 and maximum zero run length (ZRL) of 3.

11. A method according to claim 1, including concatenating an inner code of rate ⅗ on a $(1 \pm D)$ channel with rate 4/5 convolutional code to provide a combined code with rate 4/8 and maximum zero run length (ZRL) of 3.

12. A method according to claim 1, including concatenating the inner code with a convolutional code to provide a combined code rate of less than ½.

13. A method according to claim 1, including steps of: interleaving the inner code; and employing a channel transfer polynomial of $(1+D-D^2-D^3)$.

14. A method according to claim 1, wherein the inner code rate is one-half.

15. A method according to claim 1, including concatenating an inner code of rate ½ on a $(1-D)(1+D)^2$ channel with optimal rate 1 code to provide an interleaved biphase rate 2/4 code with a coding gain of at least 4.8 dB.

* * * * *